(12) United States Patent
Poberezhskiy et al.

(10) Patent No.: US 7,747,236 B1
(45) Date of Patent: Jun. 29, 2010

(54) METHOD AND APPARATUS FOR ESTIMATING LOCAL OSCILLATOR FREQUENCY FOR GPS RECEIVERS

(75) Inventors: Gennaidy Poberezhskiy, Los Angeles, CA (US); Charles P. Norman, Huntington Beach, CA (US)

(73) Assignee: SiRF Technology, Inc., San Jose, CA (US)

( * ) Notice: Subject to any disclaimer, the term of this patent is extended or adjusted under 35 U.S.C. 154(b) by 1399 days.

(21) Appl. No.: 10/020,349

(22) Filed: Dec. 11, 2001

Related U.S. Application Data

(60) Provisional application No. 60/254,983, filed on Dec. 11, 2000.

(51) Int. Cl.
H04B 1/06 (2006.01)
H04B 1/00 (2006.01)

(52) U.S. Cl. .................... 455/255; 455/264; 455/259

(58) Field of Classification Search ............. 455/255, 455/264; 342/147, 357.02, 357.05, 367.02; 375/147; 701/213
See application file for complete search history.

(56) References Cited

U.S. PATENT DOCUMENTS

| | | | |
|---|---|---|---|
| 4,426,712 A | 1/1984 | Gorski-Popiel | |
| 4,445,118 A | 4/1984 | Taylor et al. | |
| 4,463,357 A | 7/1984 | MacDoran | |
| 4,578,678 A | 3/1986 | Hurd | |
| 4,667,203 A | 5/1987 | Counselman, III | |
| 4,701,934 A | 10/1987 | Jasper | |
| 4,754,465 A | 6/1988 | Trimble | |
| 4,785,463 A | 11/1988 | Janc et al. | |
| 4,809,005 A | 2/1989 | Counselman, III | |
| 4,821,294 A | 4/1989 | Thomas, Jr. | |
| 4,890,233 A | 12/1989 | Ando et al. | |
| 4,894,662 A | 1/1990 | Counselman | |
| 4,998,111 A | 3/1991 | Ma et al. | |
| 5,014,066 A | 5/1991 | Counselman, III | |
| 5,036,329 A | 7/1991 | Ando | |
| 5,043,736 A | 8/1991 | Darnell et al. | |
| 5,108,334 A | 4/1992 | Eschenbach et al. | |
| 5,202,829 A | 4/1993 | Geier | |
| 5,225,842 A | 7/1993 | Brown et al. | |
| 5,272,446 A * | 12/1993 | Chalmers et al. ............ 329/304 |
| 5,293,170 A | 3/1994 | Lorenz et al. | |
| 5,311,195 A | 5/1994 | Mathis et al. | |

(Continued)

FOREIGN PATENT DOCUMENTS

EP 0511741 11/1992

(Continued)

*Primary Examiner*—Melur Ramakrishnaiah
(74) *Attorney, Agent, or Firm*—Mark J. Danielson; Pillsbury Winthrop Shaw Pittman LLP

(57) ABSTRACT

The present invention is a method and apparatus that produces an estimate of the local oscillator (LO) frequency error using an external reference signal. The error estimate can be used for LO calibration, correction and other purposes. The present invention does not require the external reference signal to be a precision reference signal, nor does the present invention require that the reference signal be continuously supplied. Further, the present invention can be implemented exclusively in software, and therefore does not add to the size or weight of any device that it is resident in. Thus, the present invention can be added to microcontrollers and various specialized programmable digital ICs that were not initially designed for this task.

15 Claims, 1 Drawing Sheet

U.S. PATENT DOCUMENTS

| | | |
|---|---|---|
| 5,323,164 A | 6/1994 | Endo |
| 5,343,209 A | 8/1994 | Sennott et al. |
| 5,345,244 A | 9/1994 | Gildea et al. |
| 5,347,536 A | 9/1994 | Meehan |
| 5,379,224 A | 1/1995 | Brown et al. |
| 5,402,347 A | 3/1995 | McBurney et al. |
| 5,416,712 A | 5/1995 | Geier et al. |
| 5,420,593 A | 5/1995 | Niles |
| 5,440,313 A | 8/1995 | Osterdock et al. |
| 5,450,344 A | 9/1995 | Woo et al. |
| 5,504,684 A | 4/1996 | Lau et al. |
| 5,592,173 A | 1/1997 | Lau et al. |
| 5,625,668 A | 4/1997 | Loomis et al. |
| 5,663,734 A | 9/1997 | Krasner |
| 5,663,735 A | 9/1997 | Eshenbach |
| 5,781,156 A | 7/1998 | Krasner |
| 5,786,789 A | 7/1998 | Janky |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,943,363 A | 8/1999 | Hanson et al. |
| 5,945,944 A | 8/1999 | Krasner |
| 5,963,582 A | 10/1999 | Stansell, Jr. |
| 5,977,909 A | 11/1999 | Harrison et al. |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A | 5/2000 | Krasner |
| 6,081,702 A * | 6/2000 | Serfaty et al. ............... 455/264 |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,240,556 B1 * | 5/2001 | Evans et al. ................. 725/114 |

FOREIGN PATENT DOCUMENTS

| | | |
|---|---|---|
| GB | 2115195 | 1/1983 |
| JP | 58-105632 | 6/1983 |
| JP | 7-36035 | 5/1986 |
| JP | 4-326079 | 11/1992 |
| WO | WO 90/11652 | 10/1990 |

* cited by examiner

METHOD AND APPARATUS FOR ESTIMATING LOCAL OSCILLATOR FREQUENCY FOR GPS RECEIVERS

CROSS-REFERENCE TO RELATED APPLICATIONS

This application claims priority under 35 U.S.C. §119 (e) of U.S. Provisional Patent Application No. 60/254,983, filed Dec. 11, 2000, entitled "METHOD AND APPARATUS FOR ESTIMATING LOCAL OSCILLATOR FREQUENCY FOR GPS RECEIVERS," by Gennadiy Poberezhskiy et al., which application is incorporated by reference herein.

BACKGROUND OF THE INVENTION

1. Field of the Invention

The present invention relates in general to Satellite Positioning Systems (SATPS), and in particular to a method and apparatus for estimating the Local Oscillator (LO) frequency for Global Positioning System (GPS) receivers.

2. Description of the Related Art

Cellular telephony, including Personal Communication System (PCS) and Personal Data Assistant (PDA) devices, has become commonplace. The use of such devices to provide voice, data, and other services, such as internet access, has provided many conveniences to cellular system users. A current thrust in the cellular and PCS arena is the integration of GPS technology, which is a subset of SATPS technology, into cellular telephone devices and other wireless transceivers.

For example, U.S. Pat. No. 5,841,396, issued to Krasner, which is incorporated by reference herein, describes a method of integrating GPS into wireless devices where the local oscillator for the GPS system is locked to a precision local oscillator frequency that is generated at a basestation of the cellular system. Such an approach, however, requires the cellular system to constantly deliver such a precision frequency to the cellular phone for the integrated GPS system to work properly. Many cellular systems, such as GSM and AMPS, do not have such capability. Further, the Code-Division Multiple Access (CDMA) system that is used for cellular telephony in the United States does not always have a constant delivery for such a frequency; instead, the frequency is delivered in bursts periodically to the cellular telephones. As such, the system described in the Krasner patent would not be of much use.

Further, the Krasner approach requires additional hardware to be installed in the cellular telephone, requiring additional power and weight in a handheld device. Such an approach, where size, power consumption, and weight are such critical parameters, may not be acceptable in the marketplace.

This current interest in integrating GPS with cellular telephony stems from a new Federal Communications Commission (FCC) requirement that cellular telephones be locatable within 20 feet once an emergency call, such as a "911" call (also referred to as Enhanced 911 or "E911") is placed by a given cellular telephone. Such position data assists police, paramedics, and other law enforcement and public service personnel, as well as other agencies that may need or have legal rights to determine the cellular telephone's position. Further, GPS and/or SATPS data can be used by the cellular user for directions, location of other locations that the cellular user is trying to locate, determination of relative location of the cellular user to other landmarks, directions for the cellular user via internet maps or other GPS/SATPS mapping techniques, etc. Such data can be of use for other than E911 calls, and would be very useful for cellular and PCS subscribers.

It can be seen, then, that there is a need in the art for a method and apparatus for integrating GPS and cellular devices. It can also be seen that there is a need in the art for integrating GPS and cellular devices in such a manner that minimal additional power is used. It can also be seen that there is a need in the art for integrating GPS and cellular devices in such a manner that minimal changes are made to the size and weight of cellular devices. It can also be seen that there is a need in the art for integrated GPS and cellular devices that can work in various cellular systems, e.g., CDMA, GSM, AMPS, etc.

SUMMARY OF THE INVENTION

To minimize the limitations in the prior art, and to minimize other limitations that will become apparent upon reading and understanding the present specification, the present invention discloses a method and apparatus for estimating the local oscillator frequency for GPS receivers. The present invention uses samples of a radiated frequency, as opposed to locking onto a precision frequency, to correct errors generated by a local oscillator.

An apparatus in accordance with the present invention comprises a local oscillator for generating the clock signal and a sampling clock, a sampling block coupled to the local oscillator, for receiving a reference signal and the sampling clock and for generating reference sample signals, and a local oscillator frequency error estimator, for generating an error estimate between the reference signal and the local oscillator sampling clock.

It is an object of the present invention to provide a method and apparatus for integrating GPS and cellular devices. It is a further object of the present invention to provide integrated GPS and cellular devices that use minimal additional power. It is a further object of the present invention to provide integrated GPS and cellular devices that have minimal changes in size and weight. It is a further object of the present invention to provide integrated GPS and cellular devices that can work in various cellular systems, e.g., CDMA, GSM, AMPS, etc.

BRIEF DESCRIPTION OF THE DRAWINGS

Referring now to the drawings in which like reference numbers represent corresponding parts throughout.

DETAILED DESCRIPTION OF THE DRAWINGS

Figure 1:
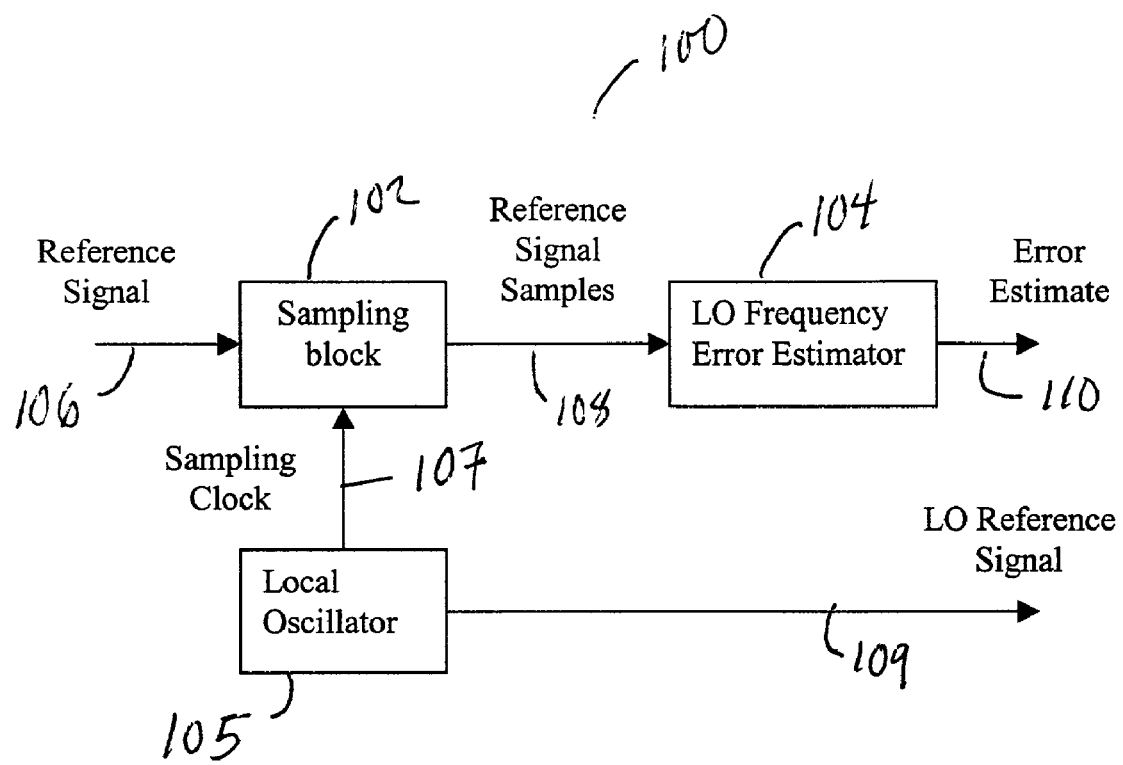
FIG. 1 illustrates the estimator of the present invention.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

The present invention is a method and apparatus that produces an estimate of the local oscillator (LO) frequency error using an external reference signal. The error estimate can be used for LO calibration, correction and other purposes. One advantage of the present invention is that the external reference signal does not have to be continuously supplied. Another advantage of the present invention is that the external reference signal does not have to be a precision signal.

Another advantage of the present invention is that the present invention can be implemented exclusively in software, and therefore does not add to the size or weight of the cellular device that it is resident in. Further, the present invention can use a non-dedicated input pin to allow microprocessors and microcontrollers that were not initially designed to perform this task to be retrofitted to perform frequency estimates by incorporating the present invention completely in software. The general purpose I/O pin can be used as a binary sampling point for the reference signal, and is typically sampled relative to an edge or a zero crossing of the LO clock signal.

Implementation

The present invention 100 comprises two main blocks: a sampling block 102 and a LO frequency error estimator 104, as shown in FIG. 1.

The sampling block 102 of the present invention performs sampling and quantization of the incoming harmonic reference signal 106 whose frequency $f_{ref}$ is accurately known. The sampling frequency $f_s$ is derived from the LO 105 frequency $f_{LO}$. The sampling frequency is also called the sampling clock 107, and can be the same frequency as the LO 105 output signal 109 Each sample can be quantized to one or more bits. Various devices can be used as a sampling block 102, ranging from a dedicated analog-to-digital converter (ADC) to a regular IC input pin. The present invention is not limited to any specific sampling block.

In the related art, a continuous reference signal that has been quantized will generate a spectrum containing the first harmonics at the frequencies $\pm f_{ref}$ and the higher order harmonics at the frequencies $\pm nf_{ref}$, n=2, 3, ... Such a quantized continuous signal can also contain the DC component. In general, the level of the higher order harmonics depends on the number of quantization bits. The level of higher order harmonics is the highest for one bit quantization, and decreases as the number of bits increases. However, in all cases the first order harmonic magnitude should be higher than the magnitudes of the higher order harmonics.

Since in the present invention the signal is typically discrete and not of a continuous nature, it has a periodic spectrum, which is unique at the interval $[-f_s/2, f_s/2]$, which will be discussed herein since this interval contains the images of all of the spectrum harmonics. Other intervals may be viewed, however, the formulas will correspondingly change depending on the endpoints of the desired interval. The position of the nth spectrum harmonic image depends on the relationship between frequency $f_n$ of this harmonic and $f_s$. The harmonic image frequency is equal to $$f_{n\,i} = f_n - f_s \cdot \text{int}(f_n/f_s + 0.5) \quad (1)$$

where $f_n = nf_{ref}$, n is any integer number. The function int(x) means the greatest integer that is less than or equal to x.

It follows from (1) that $f_s = (f_{ref} - f_{ref\,1})/\text{int}(f_{ref}/f_s + 0.5)$, where $f_{ref\,i}$ is the image of the reference frequency 106.

Therefore, if $f_{ref}$ and $\text{int}(f_{ref}/f_s + 0.5)$ are known, and the difference between the actual and nominal values of $f_{ref\,1}$ is measured, the frequency error estimator 104 can calculate the actual $f_s$ and its deviation from the nominal value. Since $f_s$ is derived from $f_{LO}$, deviation of $f_{LO}$ from its nominal value also can be estimated. This is the main idea of the LO frequency error estimator 104 implementation. It is assumed that $f_{ref}$ deviation from the nominal value is negligible compared to such a deviation for $f_{LO}$, and, consequently, $f_s$.

The LO frequency error estimator 104 uses the incoming samples 108 of the reference signal 106 to estimate the deviation of actual $f_s$ value from its nominal value, and then to compute the $f_{LO}$ error 110. There are at least three ways of implementing such an estimator 104.

Discrete Fourier Transform (DFT)

In the DFT implementation, a DFT is performed on the array of the incoming samples, and the frequency bin with the maximum magnitude is assumed to contain $f_{ref\,1}$. To increase the resolution, zero-padding can be used. This is typically the most accurate method. However, the DFT method is also the most computationally intensive and thus may not be suitable for a real-time implementation.

Frequency Detector

In a Frequency Detector implementation, a digital frequency detector algorithm is applied to the incoming samples. This method is much less computationally intensive and more suitable for real-time implementation. However, the images of higher order harmonics can significantly bias the LO frequency error estimate if the number of quantization bits is low. Preliminary filtering may be required to mitigate this effect.

Phase Detector

The Phase Detector implementation method is more accurate than the frequency detector, but it requires better timing accuracy. Its computational intensity is close to that of the frequency detector.

Sources of Errors

In using the present invention, images of the higher order harmonics that distort the estimation of the actual frequency of the first harmonic image may occur. There are two ways to mitigate this problem. First, a large number of quantization bits may be used, thus reducing the magnitudes of the higher order harmonics. An alternative or complementary solution is to choose such a relationship between $f_{ref}$ and $f_s$ that the images of the higher order harmonics with significant magnitude are located as far as possible from the image of the first harmonic. This solution does not require additional hardware.

Other errors may also be introduced due to phase noise resulting from jitter. The number of the collected samples should be large enough to overcome this problem and reach an acceptable measurement accuracy.

CONCLUSION

In summary, the present invention discloses a method and apparatus for estimating the local oscillator frequency for GPS receivers. An apparatus in accordance with the present invention comprises a local oscillator for generating the clock signal and a sampling clock, a sampling block coupled to the local oscillator, for receiving a reference signal and the sampling clock and for generating reference sample signals, and a local oscillator frequency error estimator, for generating an error estimate between the reference signal and the local oscillator sampling clock.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. An apparatus for estimating frequency errors in a local oscillator signal used in GPS receivers, comprising:

a local oscillator for generating the local oscillator signal and a sampling clock signal, wherein the sampling clock signal is derived from the local oscillator signal;

a sampling block coupled to the local oscillator, that receives an external reference signal with a known reference frequency and the sampling clock signal, and generates digital samples of the external reference signal; and a local oscillator frequency error estimator module, that determines a frequency error in the local oscillator signal by comparing respective frequencies of the digital samples of the external reference signal and the sampling clock signal.

2. The apparatus of claim 1, wherein the sampling block comprises a block selected from a group comprising a dedicated analog-to-digital converter and an integrated circuit (IC) input pin.

3. The apparatus of claim 2, wherein the local oscillator frequency error estimator module uses an algorithm selected from a group comprising discrete Fourier transform, frequency detection, and phase detection.

4. The apparatus of claim 1, wherein the GPS receiver is integrated with a mobile device.

5. The apparatus of claim 4, wherein the mobile device is a CDMA, GSM, or AMPS cellular phone.

6. The apparatus of claim 1, wherein the local oscillator frequency error estimator module runs on a microprocessor.

7. The apparatus of claim 1, wherein the external reference signal comprises one or more orders of harmonics.

8. The apparatus of claim 7, wherein a frequency of the sampling clock signal is chosen with respect to the reference frequency of the external reference signal, such that after digitization in the sampling block, images of respective frequencies of higher order harmonics with significant magnitude are located far from an image of the reference frequency.

9. A method of calibrating a local oscillator in a mobile GPS receiver, comprising:

receiving an external reference signal with a known reference frequency from an external source providing the external reference signal;

generating the a local oscillator signal;

deriving a sampling clock signal from the local oscillator signal;

sampling the external reference signal with the sampling clock signal, thereby generating digital samples of the external reference signal; and comparing respective frequencies of the digital samples of the external reference signal and the sampling clock signal, thereby estimating a frequency error in the local oscillator signal.

10. The method of claim 9, wherein the sampling and frequency error estimation are performed by software instructions to a microprocessor.

11. The method of claim 9, wherein estimating the frequency error in the local oscillator signal includes using an algorithm selected from a group comprising discrete Fourier transform, frequency detection, and phase detection.

12. The method of claim 9, wherein the GPS receiver is integrated with a mobile device.

13. The method of claim 12, wherein the mobile device is a CDMA, GSM, or AMPS cellular phone.

14. The method of claim 9, wherein the external reference signal comprises one or more orders of harmonics.

15. The method of claim 14, wherein a frequency of the sampling clock signal is chosen with respect to the reference frequency of the external reference signal, such that images of respective frequencies of higher order harmonics with significant magnitude in the digitized external signal are located far from an image of the reference frequency.

* * * * *

UNITED STATES PATENT AND TRADEMARK OFFICE
CERTIFICATE OF CORRECTION

| | |
|---|---|
| PATENT NO. | : 7,747,236 B1 |
| APPLICATION NO. | : 10/020349 |
| DATED | : June 29, 2010 |
| INVENTOR(S) | : Poberezhskiy et al. |

It is certified that error appears in the above-identified patent and that said Letters Patent is hereby corrected as shown below:

In Column 3, Line 22, delete "109" and insert -- 109. --, therefor.

In Column 6, Line 4, in Claim 9, delete "the a" and insert -- the --, therefor.

Signed and Sealed this
Twenty-ninth Day of January, 2013

David J. Kappos
*Director of the United States Patent and Trademark Office*